No. 886,835.　　　　　　　　　　　　　　　PATENTED MAY 5, 1908.
A. C. MILLER.
MEANS FOR ATTACHING PNEUMATIC TIRES.
APPLICATION FILED AUG. 23, 1905.
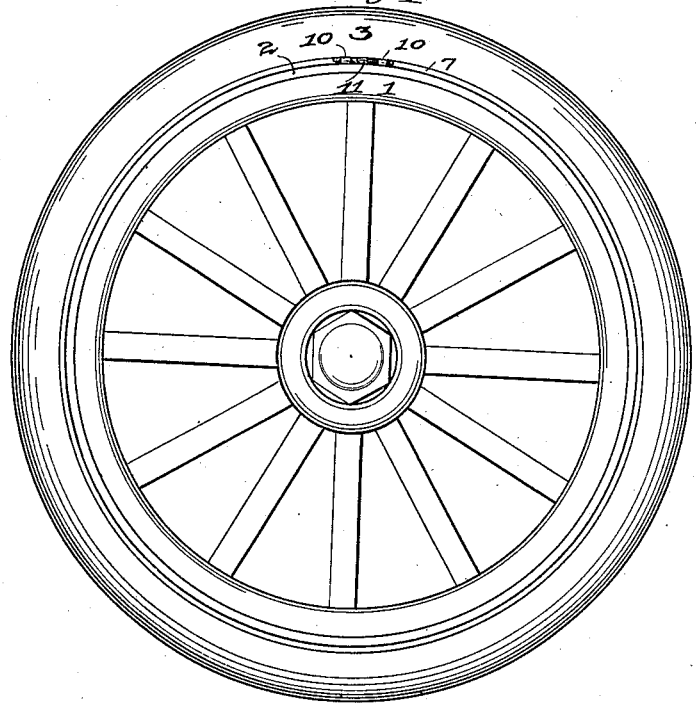
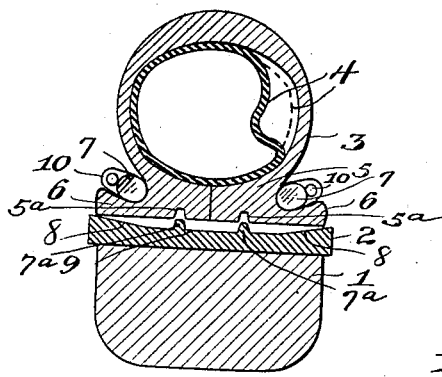
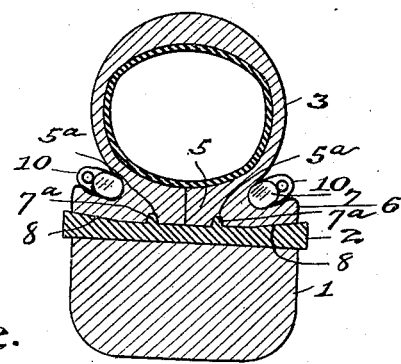
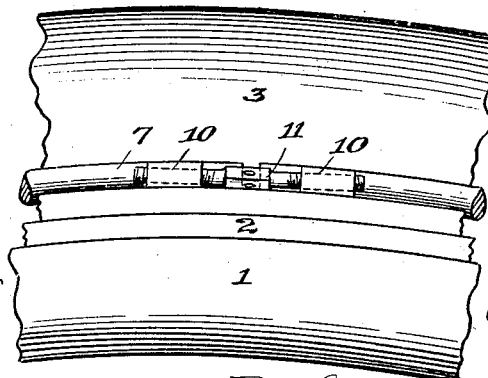
Witnesses,　　　　　　　　　　　　　　Inventor,
　　　　　　　　　　　　　　　　　　　Amos C. Miller

UNITED STATES PATENT OFFICE.

AMOS C. MILLER, OF CHICAGO, ILLINOIS.

MEANS FOR ATTACHING PNEUMATIC TIRES.

No. 886,835.　　　　Specification of Letters Patent.　　　　Patented May 5, 1908.

Application filed August 23, 1905. Serial No. 275,423.

*To all whom it may concern:*

Be it known that I, AMOS C. MILLER, a citizen of the United States, residing at Chicago, Illinois, have invented a new and useful Improvement in Means for Attaching Pneumatic Tires, of which the following is a specification.

My invention has for its object to provide a simple means for and an expeditious mode of attaching pneumatic tires of the single tube type or of the inner tube type, to the metal rim or band affording the tire seat.

My invention relates more particularly to a simple means whereby a flat metallic rim affording a tire seat is employed in conjunction with a rubber tire having lateral integral flaps or flanges extending from its base, and contractible retaining bands for clamping said flanges to the metallic rim and thereby securing the tire against displacement.

My invention is illustrated in the accompanying drawings, in which—

Figure 1 is a side elevation of a wheel with the tire applied; Fig. 2 is a similar view of a section of the wheel rim enlarged, and Figs. 3 and 4 are cross-sectional views showing the tire deflated and inflated, respectively.

In the drawings, 1 represents the wooden felly or wheel rim, and 2 the metal rim or tire.

3 represents the outer tube of the pneumatic tire, and 4 designates the usual inflatable tube such as is commonly employed in tires of this character. The base 5 of said outer tube is longitudinally severed, and said base portions are provided with the laterally extending integral flaps or flanges 6.

7 represents metallic clamping or retaining bands, which may be of any desired cross-section, although desirably oval. The outer surface of the metal rim 2 is inwardly beveled from its outer edges substantially to a line coincident with the inner sides of the retaining bands 7, thus affording the inclined seats 8 for the flanges 6 and the substantially horizontal seat 9 for the base 5.

It will be understood that the retaining bands 7 are provided with suitable means for contracting them, such as the provision of threaded lugs 10 and a turn buckle or tightening screw 11, as shown in the detail drawing, Fig. 2. By these means, and assuming the tire 3 either with or without the inner tube 4 to have been placed upon the metallic rim by slipping it sidewise thereon, and the retaining bands 7 to be seated on the upper concave or inwardly inclined seats on the upper sides of the flanges 6, said bands 7 will be contracted or shortened in length by manipulating the screw or other means provided for that purpose until the flanges 6 will be depressed upon the beveled seats 8 thereby carrying the base 5 into firm contact with its seat 9 and thus effecting a clamping of the tire base throughout its length firmly upon and within the seat of the tire rim. The effect is that the tire is as securely held as though its base were confined between marginal upstanding flanges on the rim, or as though there were mechanical connection or interlocking between the retaining bands and the metal rim, and thereby all of the advantages resulting from the absence of these flanges, viz., greater facility of application and removal of the tire, as well as simplicity of construction and economy of material, are attained.

It will be seen that with this construction the retaining band acts not only to exert vertical clamping strain upon the tire flanges, but that by reason of the beveled seats said bands exert a lateral compression upon said base, tending to force the parts thereof toward each other, thereby preventing their separation to such extent as to cause loss of air, if the tire be used as a single tube, or the pinching of the inner tube if such be used. It will be noted also that by the means above described the greatest compression upon the edges of the divided base is effected near its inner surface, and not only is this inward compression better effected by reason of the formation of the inclined seats in the outer surface of the flange, 6, but the employment of said seats effectually prevents the lateral displacement of the retaining bands themselves, and since the margins of the flanges 6 are thicker than the body of said flanges beneath the retaining bands, and the flanges 6 are deflected when clamped to conform to the inclination of the inclined seats 8, said flanges will not be withdrawn from beneath the retaining bands by lateral strain upon the tire.

While the combined downward and vertical pressure exerted by the bands upon the base of the tire and the peculiar conformation of the tire seat will be sufficient, under ordinary conditions, to prevent lateral displacement of the tire, I may provide as an additional means for preventing such displacement circumferential ribs or beads 7ª, which may be easily provided in the rolling of the metal rim, and these beads may be caused to engage grooves, 5ª in the base of the tire.

It will be obvious that my invention affords not only an economical means and a facile mode of applying and removing the tires, but that they effectually prevent creeping of the tires and that without injury to the flaps or flanges. Furthermore, the thickness of the base of the tire and the shape of the retaining seats and of the retaining bands enables the tire to be used temporarily in a deflated condition, for it will be observed that the tread portion of the tire when deflated will rest upon the inner surface of the base of the tire, while the sides will be doubled upon and overlie the rounded surfaces of the retaining bands 7 without injury to the tire.

While I have described the preferred forms of construction, it is obvious that my invention is not necessarily limited in its broader aspects to said structural details

I claim:

1. The herein described means for securing a pneumatic tire to a vehicle wheel, comprising a metallic wheel rim having a circumferentially depressed tire seat centrally located, and marginal inclined or beveled seats in combination with a pneumatic tire having a base portion adapted to said central seat and lateral flanges adapted to said inclined seats, and contractible retaining bands seated upon said flanges and adapted to clamp the base and flanges to their respective seats, substantially as described.

2. The herein described means for securing a pneumatic tire to a vehicle wheel, comprising a metallic wheel rim having a centrally located depressed tire seat in its outer surface, and radially inclined seats extending from the tire seat toward the margins of the rim in combination with a tire having a relatively thick base portion adapted to the central seat, and lateral integral flanges adapted to said inclined seats, the outer surfaces of said flanges being provided also with seats and contractible retaining bands applied thereto, substantially as described.

3. The herein described means for securing a pneumatic tire to a vehicle wheel, comprising a metallic rim having a circumferentially depressed tire seat provided with an upstanding bead, in combination with a tire having a relatively thick base adapted to said seat and provided with a groove to receive said bead and with transversely tapered lateral flanges on either side of said base, said flanges being thickest at their outer margins, and contractible retaining bands seated upon said flanges and adapted to clamp the tire to its seat, substantially as described.

AMOS C. MILLER.

Witnesses:
C. C. LINTHICUM,
FREDERICK C. GOODWIN.